Figure 1:
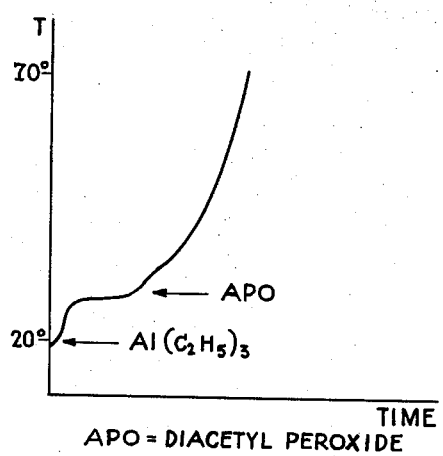
Figure 2:
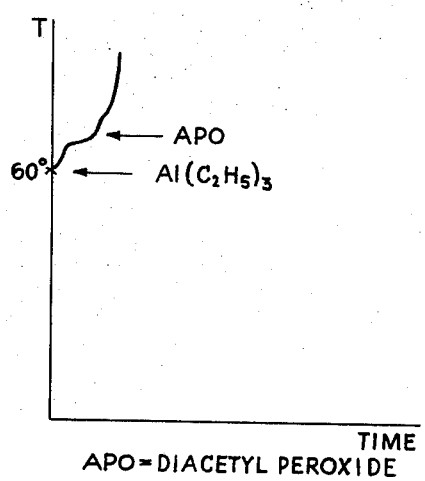

July 14, 1964

W. EHMANN ETAL 3,141,010
PROCESS FOR THE MANUFACTURE OF VINYL ESTER
POLYMERS AND COPOLYMERS
Filed Dec. 15, 1960

APO = DIACETYL PEROXIDE

APO = DIACETYL PEROXIDE

INVENTORS
WERNER EHMANN
KARL-HEINZ KAHRS
BY Curtis, Morris & Safford
ATTORNEYS

United States Patent Office 3,141,010
Patented July 14, 1964

3,141,010
PROCESS FOR THE MANUFACTURE OF VINYL ESTER POLYMERS AND COPOLYMERS
Werner Ehmann and Karl-Heinz Kahrs, Frankfurt am Main, Germany, assignors to Farbwerke Hoechst Aktiengesellschaft vormals Meister Lucius & Brüning, Frankfurt am Main, Germany, a corporation of Germany
Filed Dec. 15, 1960, Ser. No. 75,967
Claims priority, application Germany Dec. 18, 1959
10 Claims. (Cl. 260—89.1)

The present invention relates to a process for the manufacture of vinyl ester polymers and copolymers.

It is known for a long time to initiate the polymerization of vinyl esters with the aid of free radical activators, for example peroxides such as dibenzoyl peroxide, azo compounds such as azodiisobutyronitrile, or by radiation. In industry the polymerization of vinyl esters, i.e. the bulk, solution and bead polymerization of these materials, is activated with dibenzoyl peroxide or diacetyl peroxide, and the emulsion polymerization of vinyl esters is activated with water-soluble per-compounds such as potassium persulfate, ammonium persulfate or hydrogen peroxide.

The polymerization of vinyl esters with peroxides, in which generally 0.1–3% of peroxide are used, calculated on the monomer, takes place very smoothly but presents certain disadvantages. Peroxides, such as dibenzoyl peroxide, participate in chain transfer reactions whereby the course of the polymerization is impaired, especially with regard to the aim of synthesizing reproducible products that are as uniform as possible. Moreover, peroxide radicals may have a detrimental effect on the substances added to the polyvinyl resins while working up the product.

Azodiisobutyronitrile has a smaller tendency to participate in chain transfer reactions, but it is seldom used in industrial polymerizations, for example in the bulk polymerization of vinyl acetate in which high yields are to be obtained, since the resins obtained are often yellow.

When dibenzoyl peroxide or azodiisobutyronitrile are used a definite temperature limit must be exceeded (about 40° C.). In many cases, however, it is especially suitable to polymerize at low temperatures since then less branched polymers are formed (cf. Melville: P. Bosworth, C. R. Masson, H. W. Melville and F. W. Peaker, J. Polymer Science 9, 565 (1952), and G. M. Burnett, M. H. George and H. W. Melville, J. Polymer Science 16, 31 (1955)). Less branched polyvinyl esters, especially polyvinyl acetates are particularly interesting from an industrial point of view since they can be used for the manufacture of polyvinyl alcohols having a high molecular weight. When normal, that is to say branched, polyvinyl acetate is transformed into polyvinyl alcohol, the polymerization degree of the latter is in most cases considerably inferior to that of the starting polyvinyl acetate. The reason is the branching of the polyvinyl acetate. The lower the polymerization temperature of vinyl acetate the fewer the branchings of the polymer formed and the lower the degradation when the polyvinyl acetate is transformed into polyvinyl alcohol.

A number of possibilities are known for obtaining industrially useful conversions also at room temperature and at lower temperatures, but in these cases various disadvantages occur or undesired groups are introduced into the polymer. When the polymerization is activated with redox systems such as potassium persulfate/sodium bisulfite, hydrogen peroxide/sodium-formaldehyde-sulfoxilate, or hydrogen peroxide/iron ions, foreign groups may be introduced into the polymer, for example $HSO_3$-groups are introduced into the polymer with the use of sodium bisulfite, which probably participate in transfer reactions.

Heavy metal ions which can be present in different valences, such as iron ions, readily bring about discolorations of the polymer in the later working up. Chlorine-containing peroxides, which permit polymerization at low temperatures, that is to say at 0° C. and below, such as for example, bis-tri-chloracetyl peroxide, likewise yield only colored products on account of their chlorine content.

Especially troublesome are the secondary effects, caused by peroxide radicals in the polymer, when polyvinyl ester copolymers are mixed, for example with stand oil, for instance as described in German Patent 548,151. At present in the linseed oil industry, the use of various aluminum complex compounds is of increasing interest, since with their aid stand oils can be obtained at considerably lower temperatures (even at 120° C. as compared with usually 285 to 295° C.) than in the common transformation processes of linseed oil into stand oil. It is therefore not surprising that more thorough investigations are being made on the synthesis of aluminum complex compounds for drying oils (cf. Paint Manufacture (1958), 28 (4), 112; (6), 169; (8), 243; (10), 303). Products which come into consideration are obtained by reacting aluminum alcoholates with higher fatty acids. In this reaction there are probably formed derivatives of chelate character having the following structure:

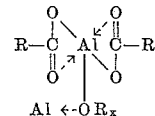

Al ←-$OR_x$ wherein R stands for a fatty acid radical and $R_x$ for an alkyl group. The advantage of said products resides in their good compatibility with resins and their excellent solubility properties.

If polyvinyl esters and especially polyvinyl acetate were mixed with the aforesaid products, a residual peroxide content would again impair the good compatibility with resins and the good solubility properties.

Attempts have therefore been made to polymerize vinyl esters at about 0° C. in the presence of suitable aluminum compounds.

It has now been found that the polymerization of vinyl esters and especially of vinyl acetate takes place very favorably even at low temperatures under the action of a combination of at least one aluminum trialkyl and a very small amount of at least one organic peroxide and/or organic hydroperoxide and that polymers are thus obtained which, on account of the very minor amounts of peroxide required for their manufacture, contain extremely low amounts of residual peroxides, so that the mixing with, for example linseed stand oil, does not involve any difficulty.

Suitable aluminum trialkyls are those of which the identical or different alkyl groups carry 1 to 12 carbon atoms and preferably 1 to 5 carbon atoms such as, for example aluminum triethyl, aluminum triisobutyl and the like. These compounds are used in an amount in the range of from 0.1 to 5% and preferably 0.2 to 1%, calculated on the monomer.

As peroxides there can be used alkyl peroxides, ketone peroxides, aldehyde peroxides and especially acyl peroxides such, for example, as dilauroyl peroxide, diacetyl peroxide or dibenzoyl peroxide. Suitable hydroperoxides are alkyl hydroperoxides such, for example, as tertiary butyl hydroperoxide. In order to avoid the initially mentioned disadvantages the peroxides or hydroperoxides are used in minor amounts of approximately 0.005 to 0.05%, calculated on the monomer.

Especially suitable catalyst systems are composed, for example, of aluminum triisobutyl and tertiary butyl hydroperoxide or diacetyl peroxide or dibenzoyl peroxide or of aluminum triethyl and diacetyl peroxide or dibenzoyl peroxide.

The action of said catalyst combinations is surprising and unexpected in any respect. It could not be expected that the polymerization would be initiated at all since the vinyl ester and aluminum trialkyl would appear to consume one another in a Grignard type reaction.

The unexpected synergistic action of the catalyst system can be proved by the following comparative tests: When 0.4% of aluminum triethyl is added at room temperature to vinyl acetate, a temperature increase of the mixture can be observed and polymerization sets in (up to a conversion of 30%). When 0.015% of diacetyl peroxide or dibenzoyl peroxide is then added to the aforesaid mixture, the temperature of the mixture increases very strongly and rapid polymerization takes place (cf. the accompanying FIGURE I). If under identical conditions the same amount of diacetyl peroxide is added to the same amount of vinyl acetate in the absence of aluminum triethyl, a temperature increase of the mixture cannot be observed.

When the same experiment is carried out at 60° C. rather than at room temperature, for example, it is found that the small amounts of diacetyl peroxide or dibenzoyl peroxide added do not involve temperature increase and polymerization. In contradiction thereto, the temperature rises rapidly and pronounced polymerization sets in when first aluminum triethyl and then diacetyl peroxide are added (cf. the accompanying FIGURE II).

Also when the polymerization is carried out at a still lower temperature, for example at —5° C., the temperature curves take an analogous course.

In the process of the invention there can be used as vinyl esters vinyl esters of monobasic aliphatic saturated carboxylic acids with 2-18 carbon atoms such as vinyl propionate, vinyl butyrate, vinyl stearate and especially vinyl acetate, either alone or in admixture with one another.

The selection of the reaction temperature depends on the chosen catalyst system, the chosen monomer or monomer mixtures and on the desired molecule size. In general the polymerization is carried out with the aforementioned catalyst combinations at a temperature in the range of from —10° C. to +30° C. It is likewise possible, however, to operate at lower or higher temperatures and, if desired, under pressure.

An especially suitable operating method consists in adding the catalyst combination at a very low temperature, for example at —50° C., to the monomer and then regulating the polymerization speed by allowing the temperature to rise slowly.

The polymerization can be carried out either continuously or batch-wise. The presence of inert gases for example nitrogen is desirable. Minor amounts of oxygen, however, may accelerate the polymerization.

The polymerization can be carried out in different manner, for example by first charging the polymerization vessel with a small amount of the monomer, that is to say 5 to 10% of the total amount of monomer, and adding the required amounts of aluminum trialkyl and peroxide or hydroperoxide. As soon as polymerization sets in, which can be recognized by an increase in viscosity, the monomer, aluminum trialkyl and small amounts of peroxide or hydroperoxide are added continuously. The polyvinyl ester thus obtained is well suitable for the manufacture of polyvinyl alcohols and polyvinyl acetals.

Alternatively, the total amount of aluminum trialkyl and peroxide or hydroperoxide can be added at a time to the total amount of the monomer. In this case the polymerization can be carried out almost isothermally by providing means for good heat dissipation or, in case a temperature increase need not be avoided, the polymerization can also take place with insufficient heat dissipation. The rising temperature causes a more rapid polymerization.

It is furthermore possible gradually to add the catalysts, which can be of advantage when the polymerization is carried out at higher temperatures, for example above 20° C.

The polymerization can likewise be carried out in the presence of suitable solvents.

The following examples serve to illustrate the invention but they are not intended to limit it thereto.

*Example 1*

(a) A Schlenk tube, which was in a bath of —5° C., was charged with 100 grams of vinyl acetate, the acetate was blanketed with dry nitrogen and 40 milligrams of diacetyl peroxide and 0.4 gram of aluminum triethyl were added. After 24 hours a colorless polymer block was formed. 81% of the monomer had polymerized. The polymer had a K value of 96, determined with a 1% solution in ethyl acetate.

(b) When the experiment was carried out only with peroxide and without the addition of aluminum triethyl less than 1% of polymer was obtained.

*Example 2*

(a) A flask provided with a vigorous stirrer was charged at 20° C. with 1 kilogram of vinyl acetate and 7 grams of aluminum triisobutyl. The temperature rose at once to 26° C. and then decreased again after a few minutes. Then 0.4 gram of dibenzoyl peroxide, dissolved in 10 grams of vinyl acetate, was added. The polymerization set in at once and the temperature rose within 20 minutes to 72° C. After 30 minutes 45% of the monomer had polymerized. The polymer was worked up by steam distillation, if desired, after the addition of 10 grams of methanol, or by another conventional method. It had a K value of 66, determined with a 1% solution in ethyl acetate.

(b) When the same experiment was carried out with the addition of the indicated amount of dibenzoyl peroxide but without the addition of aluminum compound the temperature did not increase and at most traces of the monomer were polymerized.

(c) When the same experiment was carried out with the addition of the indicated amount of aluminum triisobutyl but without the addition of peroxide a polymer yield of 6% was obtained after 30 minutes.

*Example 3*

(a) A flask, provided with a vigorous stirrer and installed in a bath of 30° C., was charged with 1 kilogram of vinyl butyrate, the butyrate was blanketed with nitrogen and 2.4 grams of aluminum triethyl were added. The temperature rose to 35° C. After 30 minutes it dropped again to 32° C. Further 2.4 grams of aluminum triethyl and 100 milligrams of diacetyl peroxide were then added. The temperature increase to 40° C. indicated that further polymerization occurred. After 10 hours 61% of the monomer had polymerized. The polymer obtained with a K value of 43, determined with a 1% solution in ethyl acetate.

(b) When 1 kilogram of vinyl butyrate was stirred for 10 hours at 35° C. with the same amount of diacetyl peroxide (100 milligrams) the yield obtained was only 4%.

*Example 4*

A flask provided with stirrer was charged at 17° C. with 200 grams of vinyl acetate. The charge was blanketed with nitrogen and 1 cc. of aluminum triethyl and 100 milligrams of tertiary butyl hydroperoxide were added. After 10 minutes a further 1 cc. of aluminum triethyl was added. The mixture became gradually more and more viscous and the temperature rose to 70° C. After 2 hours the unreacted vinyl acetate was removed from the resinous mass, the polymer was taken up in methanol and the methanolic solution was dried up at 50° C. under reduced pressure, 133 grams of polymer were obtained having a K value of 69.

We claim:
1. A process for the manufacture of homopolymers of vinyl esters of a monobasic aliphatic saturated carboxylic acid having 2 to 18 carbon atoms and copolymers of said vinyl esters with themselves, which process comprises the step of initiating the polymerization of at least one of said vinyl esters, at a temperature from about −50° to about 72° C., with a catalyst combination consisting essentially of 0.1 to 5 percent of an aluminum trialkyl, the alkyl groups of which contain 1 to 12 carbon atoms, and 0.005 to 0.05 percent of a member selected from the group consisting of organic peroxides and organic hydroperoxides, all percentage figures being calculated on the weight of monomeric vinyl ester.
2. A process as claimed in claim 1, in which the aluminum trialkyl is aluminum triethyl.
3. A process as claimed in claim 1, in which the aluminum trialkyl is aluminum triisobutyl.
4. A process as claimed in claim 1, which comprises carrying out the polymerization in the presence of aluminum triethyl and tertiary butyl hydroperoxide.
5. A process as claimed in claim 1, which comprises carrying out the polymerization in the presence of aluminum triisobutyl and tertiary butyl hydroperoxide.
6. A process as claimed in claim 1, which comprises carrying out the polymerization in the presence of aluminum triethyl and diacetyl peroxide.
7. A process as claimed in claim 1, which comprises carrying out the polymerization in the presence of aluminum triethyl and dibenzoyl peroxide.
8. A process as claimed in claim 1, which comprises carrying out the polymerization in the presence of aluminum triisobutyl and diacetyl peroxide.
9. A process as claimed in claim 1, which comprises carrying out the polymerization in the presence of aluminum triisobutyl and dibenzoyl peroxide.
10. A process as claimed in claim 1, which comprises using vinyl acetate as monomer.

References Cited in the file of this patent

UNITED STATES PATENTS

| | | |
|---|---|---|
| 2,868,772 | Ray et al. | Jan. 13, 1959 |
| 3,069,403 | Prapas | Dec. 18, 1962 |

OTHER REFERENCES

Furukawa et al.: Journal of Polymer Science, pages 227–229, volume 28, February 1958.